(12) United States Patent
Hofmann

(10) Patent No.: US 8,086,726 B2
(45) Date of Patent: Dec. 27, 2011

(54) XI MONITORING IN HIGH LOAD SCENARIOS (MONITORING COCKPIT)

(75) Inventor: Christoph Hofmann, Beethovenstr (DE)

(73) Assignee: SAP AG, Walldorf (DE)

( * ) Notice: Subject to any disclaimer, the term of this patent is extended or adjusted under 35 U.S.C. 154(b) by 196 days.

(21) Appl. No.: 11/963,779

(22) Filed: Dec. 21, 2007

(65) Prior Publication Data

US 2009/0164558 A1 Jun. 25, 2009

(51) Int. Cl.
*G06F 7/00* (2006.01)
(52) U.S. Cl. .......................... 709/224; 370/242; 713/200
(58) Field of Classification Search ................... 370/242
See application file for complete search history.

(56) References Cited

U.S. PATENT DOCUMENTS

| | | | |
|---|---|---|---|
| 6,564,341 B1 * | 5/2003 | Sundaram et al. | 714/43 |
| 6,871,284 B2 * | 3/2005 | Cooper et al. | 726/1 |
| 7,203,173 B2 * | 4/2007 | Bonney et al. | 370/242 |
| 7,508,941 B1 * | 3/2009 | O'Toole et al. | 380/228 |
| 2002/0169871 A1 * | 11/2002 | Cravo de Almeida et al. | 709/224 |
| 2004/0078743 A1 * | 4/2004 | Jensen et al. | 714/746 |

* cited by examiner

*Primary Examiner* — Ashok Patel
*Assistant Examiner* — Andrew Goldberg
(74) *Attorney, Agent, or Firm* — Mintz, Levin, Cohn, Ferris, Glovsky and Popeo, P.C.

(57) ABSTRACT

A monitoring "cockpit" for a message exchange system is presented. In general, the monitoring cockpit provides a set of aggregated views in a graphical user interface that present a direct and intuitive overview of the entire message exchange system. These views provide information about the current state of the message exchange system, of the alerts that have occurred in the system, and of the current state of messaging with performance data of messaging included. From these views, a drilldown function is provided for more detailed views. The monitoring cockpit is designed as a central tool to quickly get an overview of the overall state of a productive message exchange system, allow a user to analyze problems in detail by navigating to the detailed status information, and repair problems by giving links to the appropriate message exchange configuration and administration tools.

20 Claims, 14 Drawing Sheets

Inflow($I_0$)

| error | error |
|---|---|
| scheduled | scheduled |
| cancelled | cancelled |
| successful | successful |

Finished($I_0$)

Change($I_0$)

| error |
|---|
| scheduled |
| cancelled |
| successful |

M \ Change($I_0$)

FIG. 8

XI MONITORING IN HIGH LOAD SCENARIOS (MONITORING COCKPIT)

BACKGROUND

This disclosure relates generally to messaging systems, and more particularly to monitoring messages in high load scenarios in a message exchange infrastructure.

Message exchange systems, such as SAP AG's exchange infrastructure (XI), are used to integrate external systems using proprietary, legacy or standard messaging formats. In SAP's XI, for example, senders and receivers are separated from one another, and exchange messages using an Integration Server. This separation makes it easier to connect systems that are technologically different. Every system that can exchange messages with the Integration Server can also exchange messages with all other systems that are connected to the Integration Server.

SAP's XI supports direct communication using proxies, which are generated in the application systems using a description in WSDL (Web Service Description Language). XI also supports communication using adapters. In this case, interfaces for message exchange are created in the application system, or existing interfaces are used. Simple message processing on the Integration Server is stateless, e.g., the Integration Server does not know of any connections between various messages.

Cross-component integration processes, on the other hand, describe related processes, which can use the knowledge about messages that have already been processed to further control the process (for example, waiting for the corresponding response for a message in order to start further actions). SAP's XI enables enterprises to model, change, and manage these cross-component integration processes centrally. These processes are executed on the Integration Server and are included in message processing by configuration.

After starting with pilot projects for introducing a message exchange system in their enterprises, customers increasingly use those systems for bigger and more business-critical scenarios with a large message load. However, message exchange systems such as XI are very complex tools which only provide a limited means for controlling and monitoring. Thus, it is getting more and more difficult to detect errors and erroneous situations and to prove that the message exchange system is in a healthy state.

SUMMARY

A monitoring "cockpit" for a message exchange system is presented. In general, the monitoring cockpit provides a set of aggregated views in a graphical user interface that present a direct and intuitive overview of the entire message execution with the message exchange system. These views provide information about a current state of messaging. From these views, a drilldown function is provided for more detailed views.

In one aspect, a monitoring cockpit is designed as a central tool to quickly get an overview of the overall state of a productive message exchange system, allow a user to analyze problems in detail by navigating to the detailed status information, and repair problems by giving links to the appropriate message exchange configuration and administration tools.

In another aspect, a monitoring system for a high-load message exchange infrastructure is disclosed. The system includes a server adapted to acquire monitoring information from the message exchange infrastructure, and transmit the monitoring information to a graphical user interface through a communication network, the graphical user interface being configured to present the monitoring information in a plurality of views of increasing detail.

In another aspect, a method for monitoring a high-load message exchange infrastructure is presented. The method includes receiving, through a communication network, messaging data acquired from the message exchange infrastructure. The method further includes transmitting monitoring information based on the messaging data to a graphical user interface through the communication network, the graphical user interface being configured to present the monitoring information in a plurality of views of increasing detail.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 8 is a schematic of a structure showing different message states.

Like reference symbols in the various drawings indicate like elements.

DETAILED DESCRIPTION

This document describes a system and method for monitoring a message exchange system, such as an exchange infrastructure (XI). While this description is hereafter written in the context of SAP's XI as an exemplary system, those having skill in the art will recognize its applicability to other message exchange systems, platforms and infrastructures, and the claims are not intended to be limited to any particular message exchange system.

Figure 1:
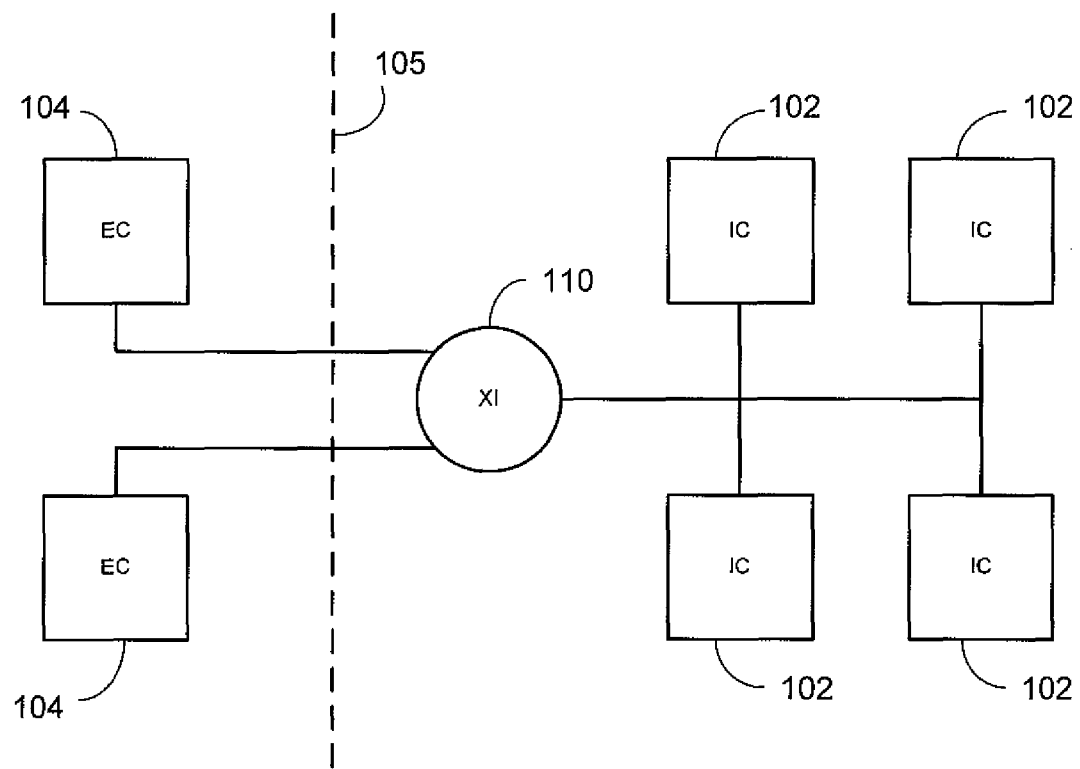
FIG. 1 is a simplified block diagram of a message exchange system.

FIG. 1 is a simplified block diagram of a system 100 for message-based integration. The system 100 include an XI 110 for collaborative processing among internal components (ICs) 102 of an enterprise, and between external components (ECs) 104 that communicate to one or more ICs 102 through a firewall 105. The ICs and ECs 102 and 104 represent any of a number of processes or services and their software and hardware, such as Web portals, buying or selling programs, electronic mail, business management programs, project planning programs, etc., and are preferably Web-based applications. Each of the ICs/ECs 102, 104 communicates with one or more other components according to at least one of a number of communication protocols, message formats, or standards.

The XI 110 is a self-contained, modularized message exchange platform for driving collaboration and integration among the ICs/ECs 102, 104. The XI 110 includes a central integration repository and directory storing shared collaboration knowledge objects. The XI 110 supports open standards such as various standard markup languages such as XML, WSDL, and SOAP, to provide an abstraction of technical interfaces for the components 102, 104, and for message-based communications across heterogeneous component interfaces. The self-contained, modularized functions of the XI 110 can be provided as one or more Web services based on standard Internet technology, and therefore can be published, discovered and accessed within a network of components 102, 104 using open standards.

Figure 2A:
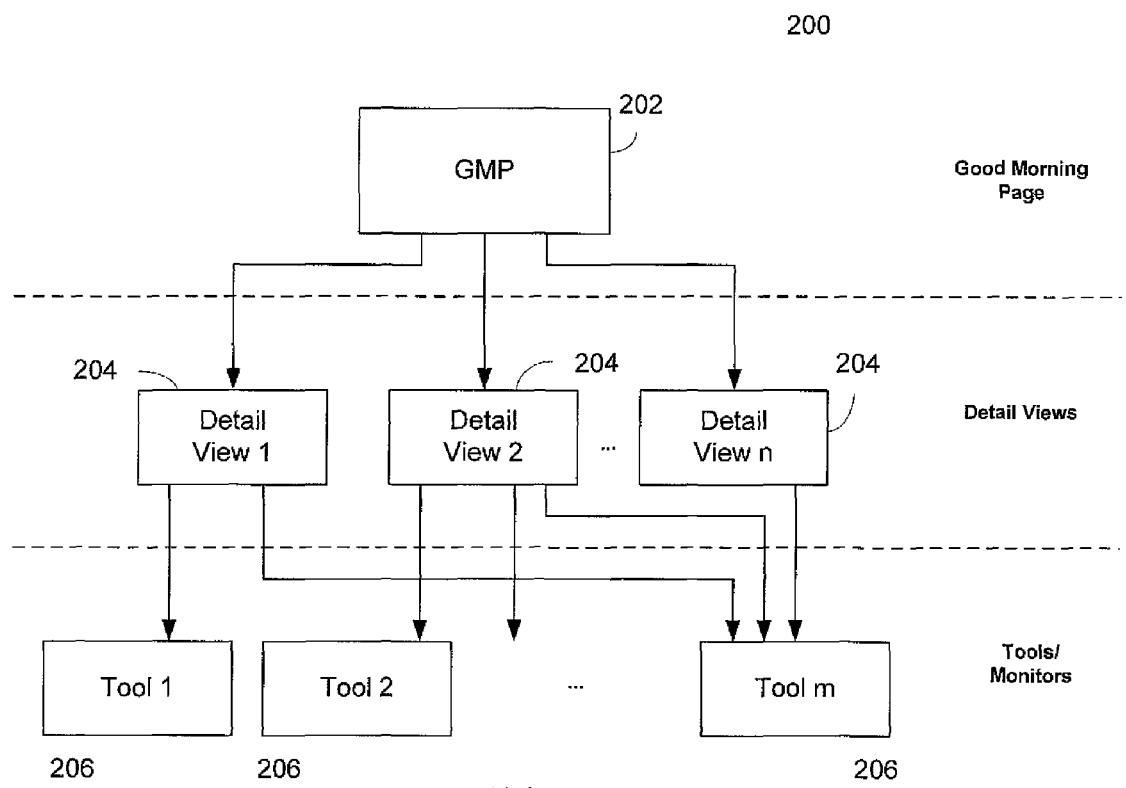
FIG. 2A illustrates a monitoring cockpit.

A monitoring system and method provides a monitoring cockpit (MC) 200, as shown in FIG. 2A. The monitoring cockpit 200 provides a quick and comprehensive overview of an XI domain, and a complete overview about the state and the healthiness of an XI domain is given on a "good morning page" (GMP) 202, an entry page of the monitoring cockpit 200. For completeness and intuitiveness, a drilldown from the GMP to all relevant detail monitors or views 204 and configuration tools 206 is enabled as schematically shown in FIG. 2A.

Figure 2B:
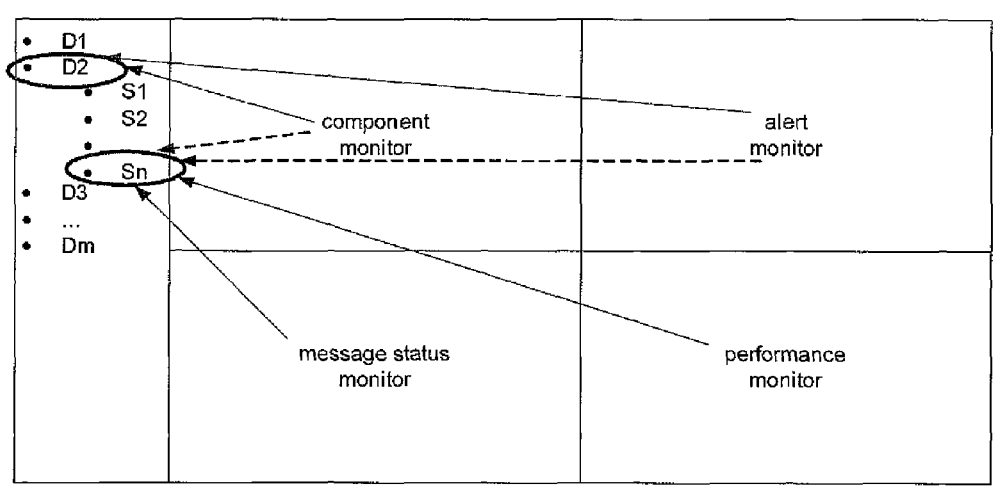
FIG. 2B illustrates a two-level navigation structure of a monitoring cockpit.

As shown in FIG. 2B, the GMP 202 provides an overall two-level navigation structure with the following navigation levels:

XI domain navigation (Dm): the recorded XI domains of the associated system landscape director SLD are shown and can be used for navigation to an individual XI domain. Whenever an XI domain is selected, a component monitor and alert monitor are displayed. The SLD is where all system components and their installed software components are maintained with their detailed information and relationships amongst each other.

Messaging scenario navigation (Sn): for a selected XI landscape, the defined message scenarios are shown and can be used for navigation to a message scenario monitor. A message scenario can be specified by the users of the MC via certain message properties, and it denotes a certain subset of all messages. A message scenario monitor includes a message status monitor and a message performance monitor. In one variation, the component monitor and the alert monitor do not refer to an XI domain, but to a messaging scenario.

The navigation structure can be represented as a tree on the left side of the MC and the individual monitors displayed on the main right part of the screen as shown in the FIG. 2B, however, other representations can be generated and displayed. In the example shown in FIG. 2B, there are m XI domains D1, . . . , Dm maintained in the associated SLD, where D2 has been selected. Within D2, there are n messaging scenarios S1, . . . , Sn, where scenario Sn has been selected. The arrows show to which XI domain/scenario the individual monitors refer. The dotted arrows represent the design variant described above.

The individual GMP monitors focus on the following areas of an XI domain, all of which are explained in further detail below:

component monitor: The status of all productive XI software components is shown both on a technical level and on the XI application level, with preferably a drilldown to component specific monitors.

alert monitor: Relevant alerts happening in a productive XI system are shown which can be either events directly from XI components or from basis or operating system components.

message status monitor: an aggregated view on the message persistence layer for a selected messaging scenario is provided where messages are grouped by their execution state, with a drilldown to the message monitors as well as to the message archive.

performance monitor: an aggregated view on the message execution performance for a selected messaging scenario is provided where maximal, minimal and average values of execution times are given.

Each of these monitors is further described below as to which information is presented both on the most abstract level of the GMP 202 and on further, more detailed levels.

Component Monitor

Figure 3:
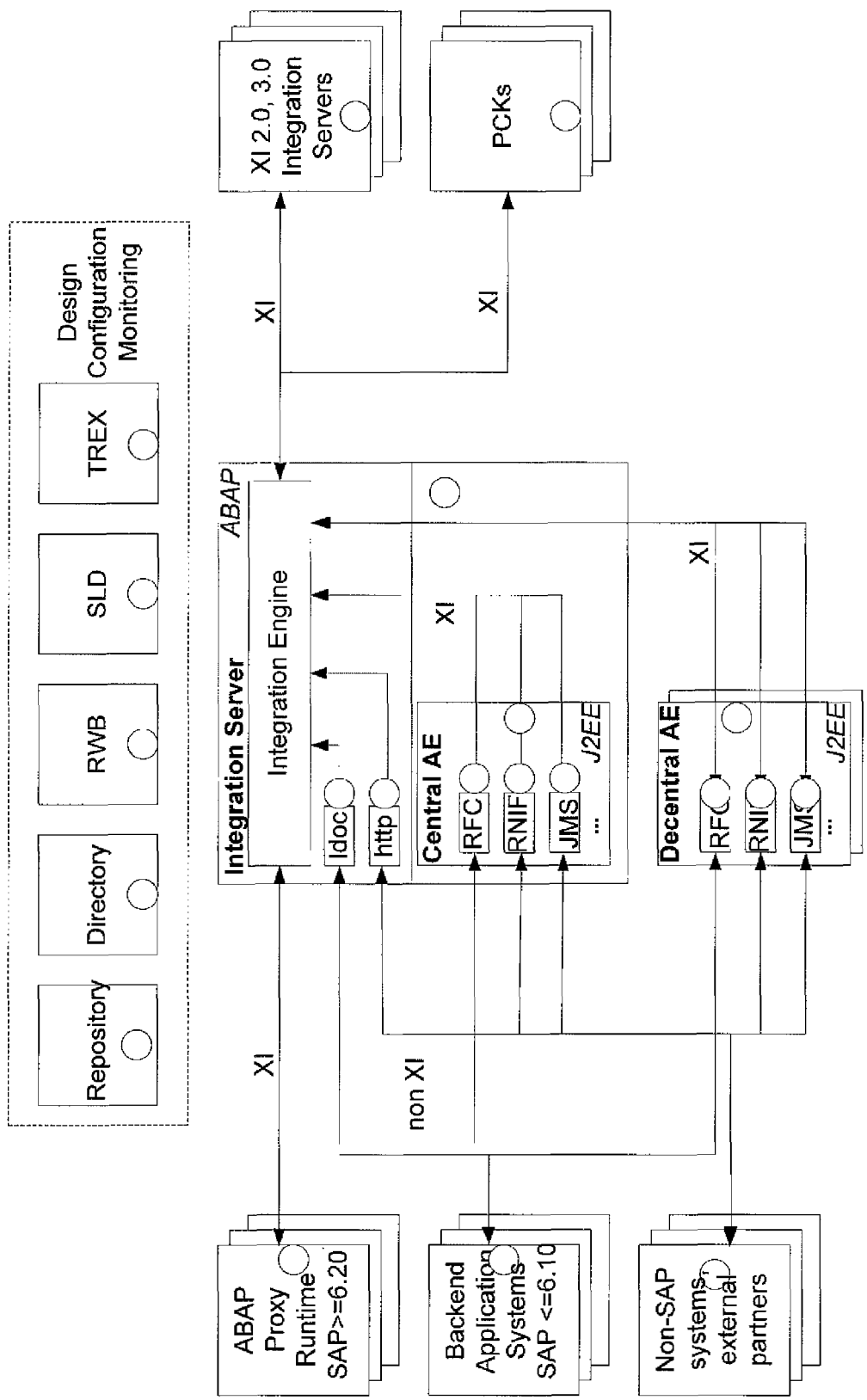
FIG. 3 is an exemplary view of a component monitor showing the status of each component as represented by a visual indicator.

The component monitor shows all components belonging to an XI domain in a landscape diagram. Furthermore, the status of each component is represented by a visual indicator (e.g. traffic light) denoting the healthiness of this component in the GMP 202. FIG. 3 illustrates how one such a component monitor could look.

The status of the components is generally implemented by specific health checks that determine the healthiness of a certain component according to component-specific criteria. For example, the messaging components can be checked for the number of messaging errors or the resource consumption of the messaging processes. In general, each health check is represented by certain numeric indicators, and the thresholds of these indicators should be customizable with respect to the traffic light representation. For each component, a drilldown to several specific monitors and information resources and— if possible—to the corresponding configuration tools should be possible. A drilldown can be made e.g., via double-clicking a component (default component monitor for individual component) or via the component's context menu to other specific monitors.

Alert Monitor

The alert monitor is used to monitor XI relevant events. The user can choose from a set of all possible types of XI relevant events for which an alert should be raised. This may also depend on values or thresholds related with the event. The relevant events can be categorized by the following categories:

XI runtime events: can include messaging events/alerts, such as:

a message runs into error a missing message message violates service level agreement (as defined by administrator) which may be based on performance data.

message payload alerts, e.g. if a certain condition on the message payload is met.

XI runtime events can also include XI runtime components, such as:

XI channels caches

Business Process Management (BPM), a part of XI.

runtime queues, including queue states and thresholds

Another category is events from XI components, which can include SLD, Directory and other components. Yet another category is events for operating system and hardware components, which includes: Database, File system, J2EE threads and resources, XI services in J2EE engine, and other components.

The following table gives an overview about relevant monitors for some of the main XI components:

| XI component monitors, tools | Integration Server | Adapter Engine | Directory | Repository | Backend Systems |
|---|---|---|---|---|---|
| operating system settings | X | X | X | X | X |
| XI basic mechanisms | | | | | |
| XI settings | X | X | X | X | X |
| SLD access + self registration | X | X | X | X | X |
| Exchange Profile access | X | X | X | X | X |
| XI runtime monitoring | | | | | |
| runtime caches | X | X | — | — | X |
| message queues | X | X | — | — | X |
| message monitors | X | X | — | — | X |
| message archives configuration and job executions | X | X | — | — | X |
| TREX configuration | X | X | — | — | — |

Alert Overview

In the user interface of the alert monitor, there is a view for showing all configured events having occurred within a recent time period. In this view, all configured event types are shown by their cardinality, e.g. by a bar chart. For each event type, a drilldown to the individual monitored alerts should be possible where a detailed list of these alerts is given. Furthermore, it should be possible to prioritize alerts, at least to distinguish certain alerts with priority 'high'. Then, subset of all priority 'high' alerts should also be shown in the alert monitor in a more detailed list. The following table illustrates an example of the priority High alert list:

| alert category | alert data | alert details |
|---|---|---|
| message runtime error | MAPPING_RUNTIME | interface-name: CreatePurchaseOrder |
| message runtime error | HTTP_ERROR: RECEIVER NOT AVAILABLE | receiver system: CUSTOMER1 |
| system alert | DATABASE: Threshold reached for free database space | Decentral Adapter Engine: AE5 |
| BPM alert | Process Timeout | Processname: ConfirmBalanceSheet |
| message runtime error | MESSAGE MISSING | sender system: SUPPLIER2 interface-name: ConfirmDelivery |

Implementation: Existing Infrastructures and Alert Framework

There are two infrastructures generating and processing alerts which are the CCMS infrastructure and the alert framework. The CCMS infrastructure is intended for system administrators to get an overview of the relevant system events. There are already defined several XI specific alerts in CCMS monitoring set "Exchange Infrastructure" (mainly belonging to category "XI runtime components"). There may be other alerts on the operating system or the WebAS that are relevant for XI which are only available in other monitoring sets (e.g. CCMS monitoring sets "J2EE Monitoring Template" or "SAP central monitoring console"). These events should be either included into the XI monitoring set or these events should be included into the MC alert monitor directly. What is important is that it can be configured which CCMS alerts will be included in the MC. In contrast, the alert framework can be used for implementing business specific alerts. The alert framework is already used for monitoring messaging errors and errors in XI channels.

Alert Forwarding

Figure 4:
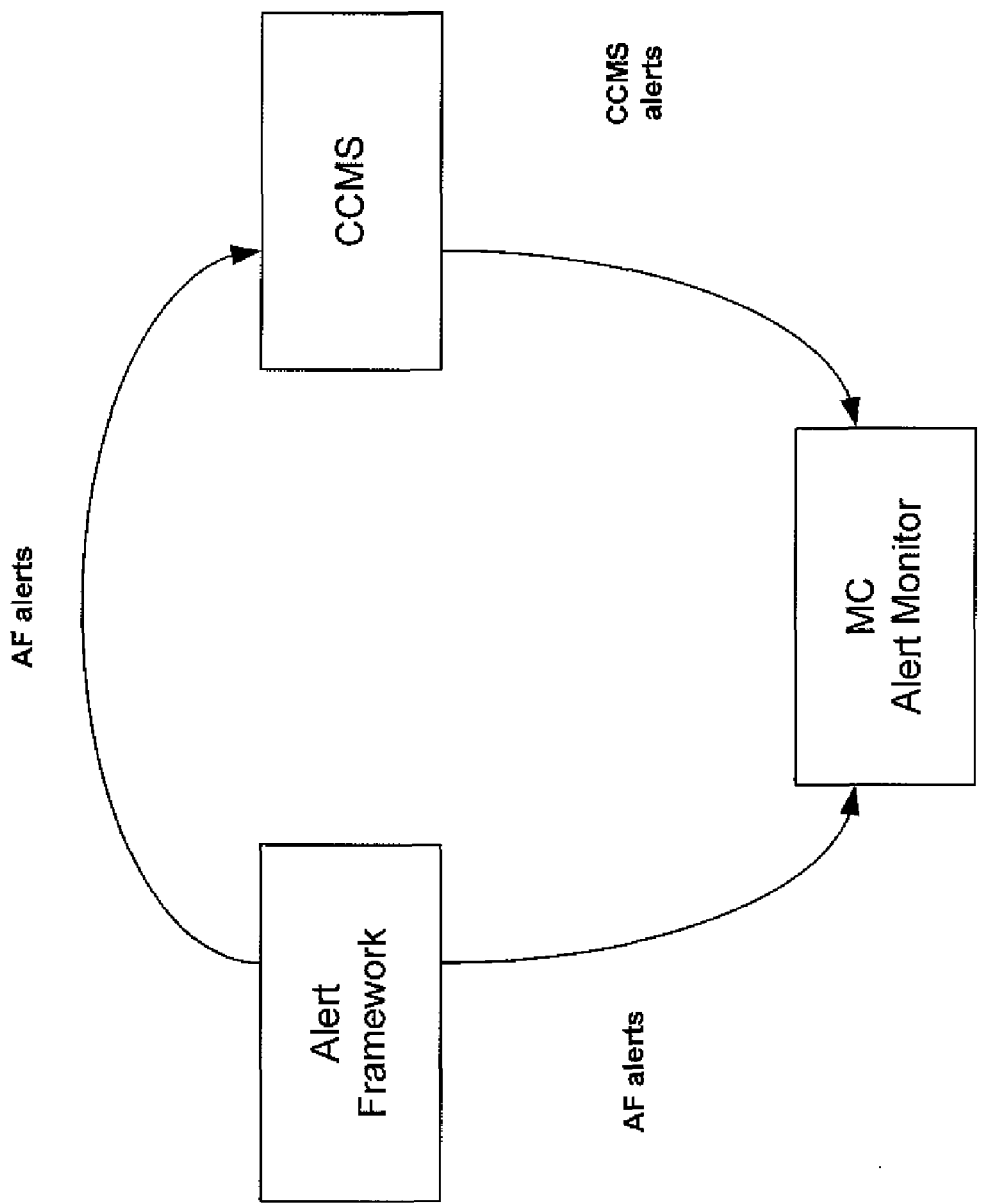
FIG. 4 shows the data flow of an alert forwarding process.

XI alerts from the alert framework are regularly forwarded to CCMS in an aggregated form via a batch job. The reason is that CCMS is a central tool that can be integrated with external monitoring tools. For the MC, both alerts from CCMS and the alert framework have to be forwarded to the alert monitor. Therefore, overall data flow is shown in FIG. 4. The data forwarded to the MC should provide sufficient detail information to display at least the necessary information of the priority 'high' alerts and to allow navigation to the respective alerting tools.

Identification of Alerts

As described above, there are currently predefined XI alerts in the CCMS, defined in monitoring set 'Exchange Infrastructure' and in the Alert Framework, for error messages and erroneous channels. It should be possible to define new alerts and integrate them into the alert monitor. XI specific alerts, which must be implemented in the alert framework, can be distinguished from technical alerts which are defined in the CCMS.

Message Status Monitor

The message status monitor provides several views on the messaging performed by the messaging components that can be selected in the user interface for the relevant messaging scenario. There are static and dynamic views on the current message stores, and there are historic views showing the development of the messaging over time.

Message Stores

Message execution is the central business of an XI. During message execution, different versions of the individual messages are stored in different storage types by the messaging components, which are the Integration Server and the Adapter Engines. The different types of data stores include.

Persistency layer: messages are stored in the database of the individual messaging components in different versions which is requisite for asynchronous messages and synchronous erroneous messages, but optional for successful synchronous messages. This persistency layer can be observed by the different message monitoring components.

Message caches/main memory: the adapter engines offer a main memory cache where the latest messages are also stored. Also successful synchronous messages are stored here.

TREX: messages from the persistency layer can be transferred to an optional TREX component where they are indexed for a payload search.

Archive: after a configurable time successful messages are either deleted or archived. Therefore, older messages can be present in the archive as well.

A message can be sent to XI via an adapted protocol supported in the Adapter Engine (AEin) or directly via native XI protocols to the Integration Server (ISin). Correspondingly, XI can send messages to a receiver via an adapted protocol supported in the Adapter Engine (AEout) or directly via native XI protocols by the Integration Server (ISout). Exemplary systems in which the cases (ISin) and (ISout) occur include XI 3.0 ABAP or Java proxies, Idoc Adapter and Plain HTTP adapter.

This implies in general for cases of message execution:
(i) (ISin)->(ISout): →IS→
(ii) (ISin)->(AEout): →IS→AE→
(iii) (AEin)->(ISout): →AE→IS→
(iv) (AEin)->(AEout): →AE→IS→AE→

The system must distinguish between synchronous and asynchronous message execution with respect to the storage of messages in the persistency store and their message states. Furthermore, there can be a shortcut scenario for performance reasons where no Integration Server is involved at all, leading to an additional case:
(v) (AEin)->(AEout): →AE→

Furthermore, the system must distinguish between synchronous and asynchronous message execution with respect to the storage of messages in the persistency store and their message states.

Asynchronous Messaging

Figure 5:
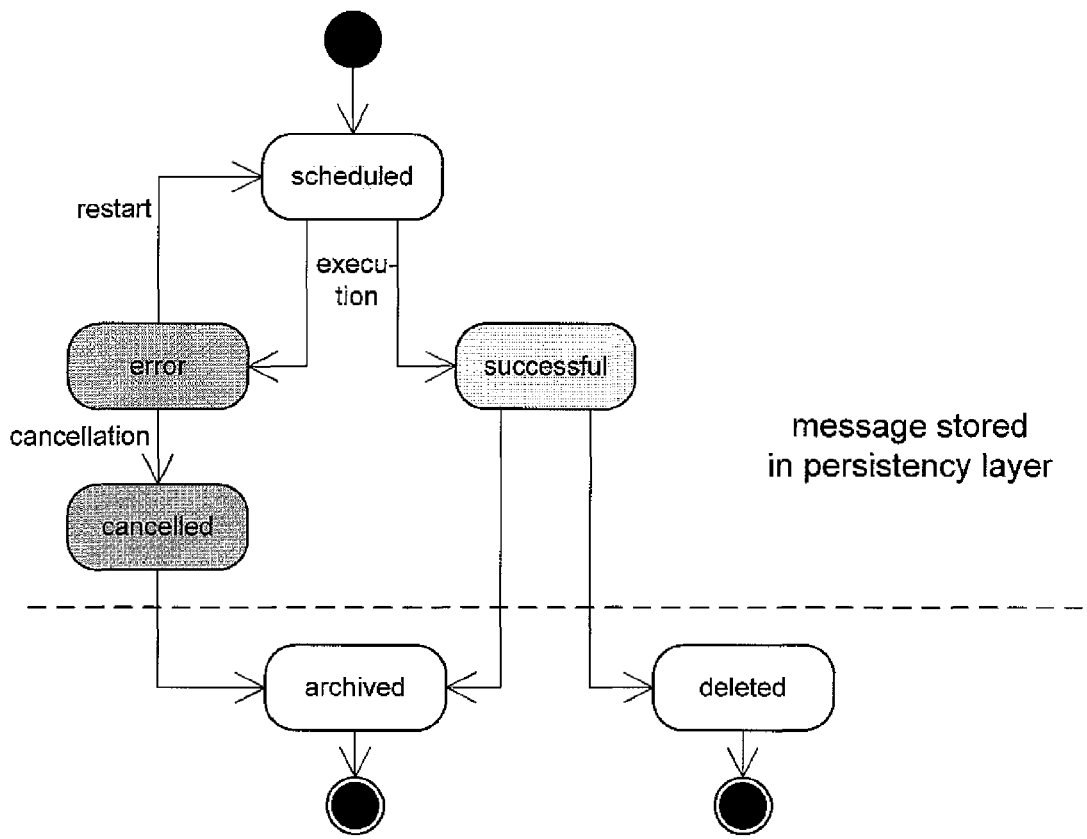
FIG. 5 is a state transition diagram illustrating a life cycle of message states within each messaging component.

Asynchronous messaging works as a store-and-forward mechanism where each message is stored in the respective messaging component before actual execution, and each message evolves in a life cycle of message states within each messaging component which is schematically represented by the state transition diagram shown in FIG. 5.

First, a message is scheduled where it can be scheduled for immediate execution or for later batch-mode execution. This execution of the message either ends successfully or the message is stored in an error state. The message execution can be done in several steps, where the message is scheduled several times after reaching a successful or error state. Erroneous messages can either be restarted and rescheduled, or their further execution can be cancelled. Successful messages are either archived or deleted after a certain holding period. Cancelled messages are always archived.

Note that in execution cases (ii)-(iv) with multiple XI messaging components involved, the message is stored in state scheduled in the next peer messaging component if and only if the message is stored in state successful in the previous peer messaging component according to the asynchronous XI protocol.

To describe the overall state of asynchronous messaging as mirrored in the persistency layer, the clustered messages can be enumerated by their state component-wise:

$$(*) M = \Sigma AEin \cup \Sigma IS \cup \Sigma AEout$$

where $\Sigma AEin$, $\Sigma IS$, $\Sigma AEout$ mean the set of all messages stored in the persistency of an Adapter Engine on the inbound side, in the persistency layer of the Integration Server (both inbound and outbound) and in the persistency of an Adapter Engine on the outbound side, respectively.

But, as described above, messages are counted several times when they have successfully passed a messaging component in a multi-component scenario. To count each message only once, the messages can be enumerated as the following disjoint union of messages;

$$(**) M = AEin[scheduled|error|cancelled] \cup IS[scheduled|error|cancelled] \cup ISout[successful] \cup \Sigma AEout$$

where AEin[scheduled|error|cancelled] and IS[scheduled|error|cancelled] denote the set of all messages stored in the persistency of an Adapter Engine on the inbound side in a scheduled, error or cancelled state, and in the Integration Server having state scheduled, error or cancelled, respectively.

Messages having performed a message split with more than one receiver can be subsumed into this state concept as a split message gets into final state successful and schedules several child messages in the Integration Server. Accordingly, BPE messages with a process as the target go into state successful after reaching its process in the Integration Server and get newly scheduled when a process creates a new message.

Synchronous Messaging

During synchronous message execution the message response is immediately given back to the sender either with a successful execution, or with an error and the messages. Therefore, synchronous messages have only one of the two mutually exclusive states successful or error which are both initial and final states. Again, the messages can be clustered component-wise. Calculating a disjoint union is more difficult because an error originating in some messaging component is also shown in previous messaging components.

$$(***) M = AEin[error] \cup ISin[error] \cup IS[successful]$$

Business Scenarios

It should be possible to define more specific views on the overall set of messages stored in the XI data stores. The most important views refer to business scenarios which are mainly defined by the message header data sender (party and service), receiver (party and service) and interface (name and namespace). Thus, an atomic scenario is defined by a 6-tuple containing these values where also generic * values are possible. Furthermore, a scenario can be defined as a union of atomic scenarios, which can further defined as a corresponding set of 6-tuples. Thus, the set of all messages is defined as the 6-tuple (*,*,*,*,*,*).

Backend Systems

Backend systems send and receive messages from XI messaging components. The backend systems support the following adapted protocols: XI protocol (ABAP and Java proxies), Idoc, RFC and Webservices messages (the latter being mediated over the XI or point-to-point). Messages of other protocols can also be monitored by the backend systems as well.

The message monitor of the GMP is preferably a simple diagram representing the execution of synchronous and asynchronous messages in the XI landscape as represented in the local persistence layers of the associated messaging components.

Static Views

Static views represent a snapshot of the current state of the persistence layer. Note that successful synchronous messages are not stored per default in the persistence layer, but all message data necessary for monitoring are nevertheless stored. Furthermore, component views are distinguished from landscape views for every static view which is explained below.

Message Status View

The main view on the persistence layer is the message status view where the messages belonging to a messaging scenario are partitioned according to their execution status.

Component View

In a component view, the local persistence layer of one component is shown where the messages are grouped by their conceptual message states. The default view counts the number of messages, but alternatively the messages can be represented according to their message size. One issue is how to calculate the size of an individual message, but in some implementations only the size of the actual message version is counted, without taking into account previous versions. Both synchronous and asynchronous cases can be represented grouped by their message state, where for synchronous messages only two states (error and successful) are possible.

Figure 6:
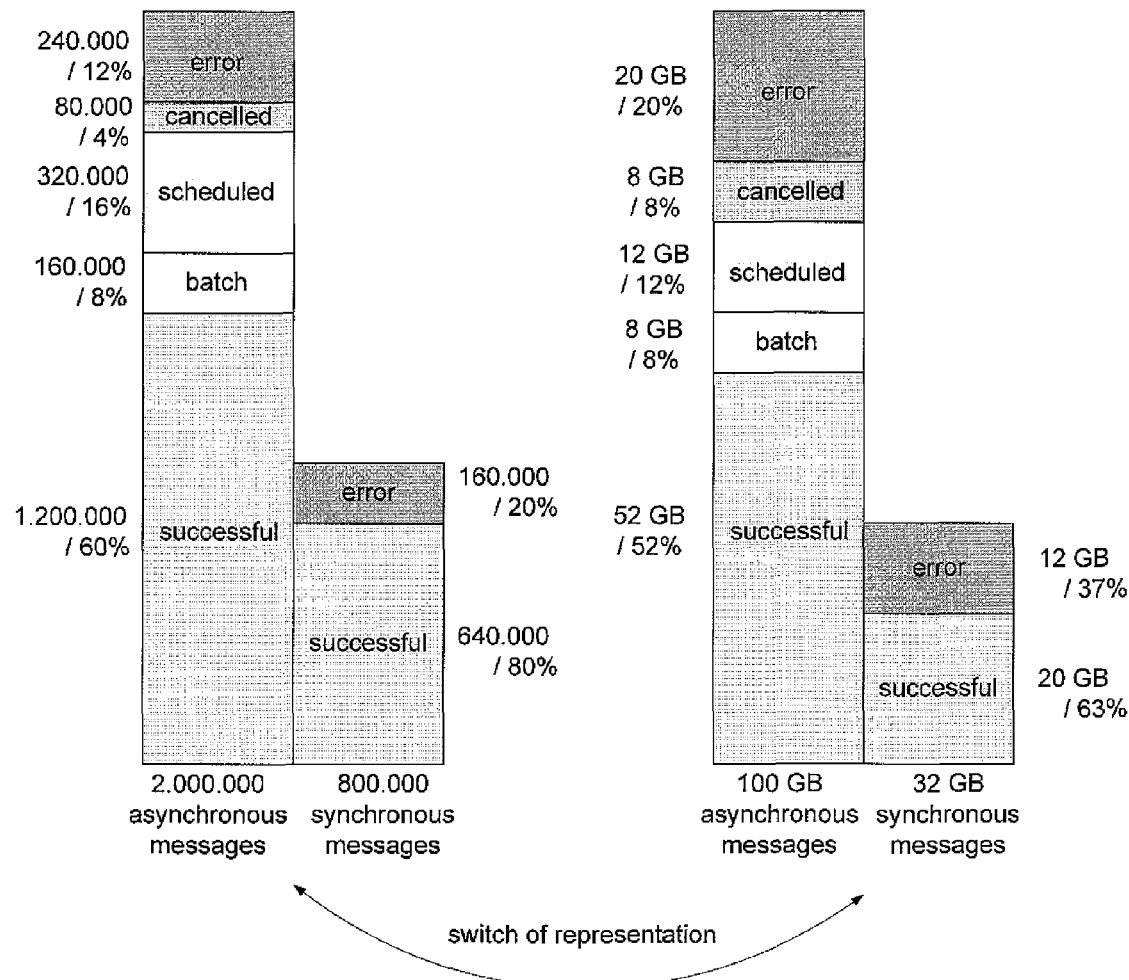
FIG. 6 depicts a component message overview.

A component message overview can be depicted as illustrated in FIG. 6. Note that successful synchronous messages are not stored by default in the persistency layer, so the corresponding message attributes should be stored for monitoring purposes nevertheless. The depiction in FIG. 6 is appropriate for the Integration Server. For message component playing both the role of a sender and a receiver, separate views on messages regarding these two roles are reasonable. These components are Adapter Engines and backend systems.

Figure 7:
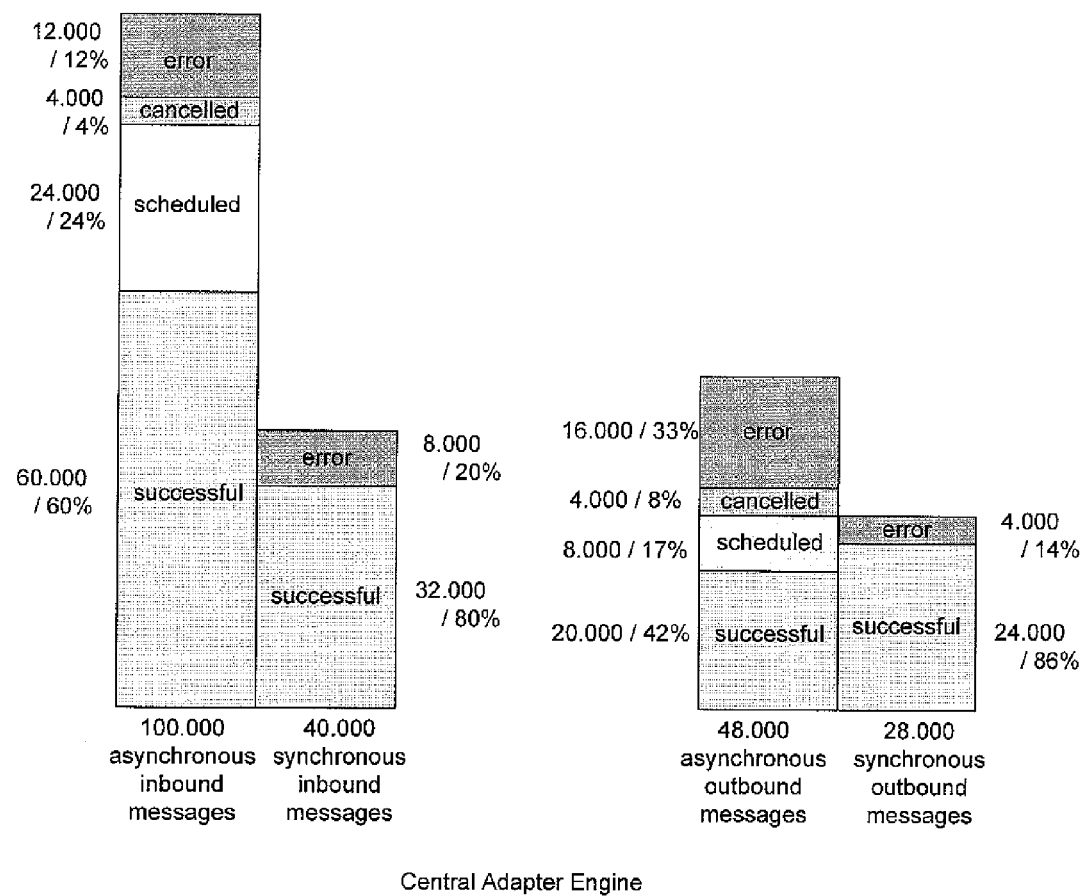
FIG. 7 shows a component view for an adapter engine.

As described above, the inbound and outbound sides for an Adapter Engine are distinguished as being denoted AEin and AEout above. Therefore, the component view for an Adapter Engine would look as illustrated in FIG. 7. In this example, there are more inbound messages than outbound messages, which could be due to many messages sent to the backend via an Idoc Adapter not located in the Adapter Engine. Within an Adapter Engine, specific message views for individual adapters could also be presented.

Landscape View:

In contrast, in a landscape view there is an aggregated view of all persistency layers belonging to the XI landscape. For the landscape view, messages are represented appropriately with or without counting several times a message that is stored in all persistence layers from the sender to the receiver messaging component. With respect to the overall view, it is preferably ideal to avoid multiple counts of a single message leading to the representation of the disjoint union outlined in (**). If not possible, the overall view can be represented by the simple union as of (*).

Further Views

There are further views besides the message status view possible representing a snapshot on the persistence layer. They all are partitions of the messages belonging to a messaging scenario according to relevant attributes that are transparently stores in the persistence layer. In each of these views, the individual partitions should be farther partitioned according to their message status. Some of these views are:

Adapter and channel views: a subset is built with respect to a certain adapter type or individual channel.

Message size: a subset is built containing messages whose message size is within a certain interval Priorities: a subset is built containing messages having certain priorities. Note however that message prioritization is not yet implemented except a local configuration in the Integration Server for message header data.

Execution times: a subset is built containing messages having certain execution, backlog or error times (see Performance Monitor below).

Dynamic View

As discussed previously, the main criterion for the message persistence overview has been the grouping by the actual message state at current time $t_0$. In this section, the time interval $I_0=[t_1,t_0]$ with $t_1<t_0$ and the message executions within this current interval can be considered, thus providing a more dynamic view on the persistency layer. The start time $t_1$ of interval $I_0$ can be chosen freely. Furthermore, for describing the lifecycle of a message m more precisely at current time $t_0$, we introduce the following message times with respect to m, being the start time $t_S(m)$, the last update time $t_C(m)$ and the end time $t_E(m)$. Note that all times either refer to the message execution on a single XI component or the entire XI domain. It can be assumed that this context is clear when these message execution times are applied.

$t_S(m)$=time when message has been received by certain messaging component/XI domain $t_C(m)$=time when message has been updated recently by certain messaging component/XI domain $t_E(m)$=time when message has finished execution and reached a final state from set (successful, cancelled) in messaging component/XI domain.

For messages that are not completed yet (not in state successful or cancelled), $t_C(m)$ denotes the time of a message's last status update. Note that for messages just scheduled $t_C(m)=t_S(m)$ and for completed messages $t_C(m)=t_E(m)$. The relevant times for message execution are $t_S(m)$ and $t_C(m)$.

As stated above, for each message, the start and end time $t_S$ and $t_C$ are stored. With these times given, we can define the following message sets for a given time interval I:

Change$(I)=\{m \in M | t_C(m) \in I\}$

Inflow$(I)=\{m \in M | t_S(m) \in I\}$

Finished$(I)=\{m \in M | t_C(m) \in I$ state$(m) \in \{$successful, cancelled$\}=\{m \in M | t_E(m) \in I\}\}$ In other words, Inflow(I) denotes all messages having arrived within I, Change (I) denotes all message with their last status update within I and Finished(I) denotes all messages set to a final state within L In case of a message split the father message is in a final state and the child messages are elements of Inflow at the moment of the message split. Note that set Change(I) does not deliver any information about how many times a message has been changed within I or before I.

For the current interval $I_0$ the following assertions hold:

Inflow$(I_0) \subset$ Change$(I_0)$

Finished$(I_0) \subset$ (Change$(I_0)$)

The structure of these sets with respect to the different message states is shown schematically in FIG. 8 which represents the update view of $I_0$: Set Inflow($I_0$) may contain messages of all possible states whereas Finished($I_0$) only contains messages of states successful or cancelled. The intersection of both sets needs not be empty because messages arrived within $I_0$ may also be set to a final state within $I_0$. Set M\Change($I_0$) contains all messages that have not been changed in $I_0$, but before $t_1$.

From this structure we can conclude that each message set V represented by a persistency status defined in the previous section can be partitioned into the following three subsets:

V∩Inflow($I_0$)

V∩(Change($I_0$)\Inflow($I_0$))

V∩(M\Change($I_0$))

Thus, the update view can be given for each static persistency view of corresponding set V giving information on what has changed in V within interval $I_0$. Note that when looking only at synchronous messages, all three sets Change($I_0$), Inflow($I_0$) and Finished($I_0$) are equal where final state cancelled of asynchronous messages corresponds to the final state error of synchronous messages. Also of note is whether the message load has increased or decreased within $I_0$. The message load can be measured by the number of non-final messages calculated by the following formula:

$$\text{Load}^M(t_0) = \text{Load}^M(t_1) + |\text{Inflow}(I_0)\backslash\text{Finished}(I_0)| - |\text{Finished}(I_0)\backslash\text{Inflow}(I_0)|$$

where $\text{Load}^M(t_0)$ denotes the number of messages at time to that are not in a final state. Set $\text{Inflow}(I_0)\backslash\text{Finished}(I_0)$ represents new messages arrived within $I_0$ that must be added to the message load as they are not in final state and set $\text{Finished}(I_0)\backslash\text{Inflow}(I_0)$ denotes messages that have been finished within $I_0$ but have already belonged to $\text{Load}^M(t_1)$ and, therefore must be subtracted.

With respect to the message size, an analogous formula can be given:

$$\text{Load}^S(t_0) = \text{Load}^S(t_1) + \text{Size}(\text{Inflow}(I_0)\backslash\text{Finished}(I_0)) - \text{Size}(\text{Finished}(I_0)\backslash\text{Inflow}(I_0))$$

where $\text{Size}(M)$ denotes the sum of the message sizes of messages in M

Historical Views

As described above, the static persistence layer views and the update views represent static and dynamic views on the actual persistency layer, respectively. They provide a snapshot at the current time to when this view has been taken. But it is also important to see developments of the persistency layer and the message execution over time.

It is evident that for a past point in time t, it is not possible to calculate the persistence layer view of that time from the actual persistence layer view because for a message M with $t_S(M) < t < t_E(M)$ we do not know the state as we have not stored the state transition times for M. Therefore, the approach of constructing historical views is to regularly store all numbers of the relevant views on the persistency layer to know the state when this snapshot was taken. These numbers represent the corresponding message set partitions of the different views and can be presented by their absolute and relative numbers. However, the drilldown to individual messages is generally not possible as the historical views represent messages in an earlier point in time. Furthermore, messages in final state are either deleted or only stored in the message archive after a customizable holding time.

For the time model, assume the recording of the historic views has started at time $h_0$ and has been regularly continued at times $h_1, h_2, \ldots$ until $h_m$ (with $h_{i+1} - h_i$ constant, e.g. one day). This set of points for storing historical views is called H. Thus, all historic values from H since $h_0$ are available, but in practice only the most current values are displayed. Nevertheless, a complete historic picture can be provided. Views on previous intervals may be aggregated to bigger time intervals for getting a complete picture within one diagram.

To summarize, the differences between the persistency views and the historical views are as follows:
- snapshot at the current time vs. snapshot at earlier fixed times from H
- no drilldown to persisted messages is possible in historical views
- already deleted and archived messages are represented in historical views in an aggregated way Historical Persistence Layer Views This view shows how the persistence layer has developed over time. Per default, the component and landscape views are stored. Special customizable views (like special business scenarios or channel views) can additionally be stored, but this has to be configured. The representation of a historical persistence layer view is represented by a timeline where each state is represented by a separate curve. These curves may be added or displayed individually in the same diagram.

Figure 9:
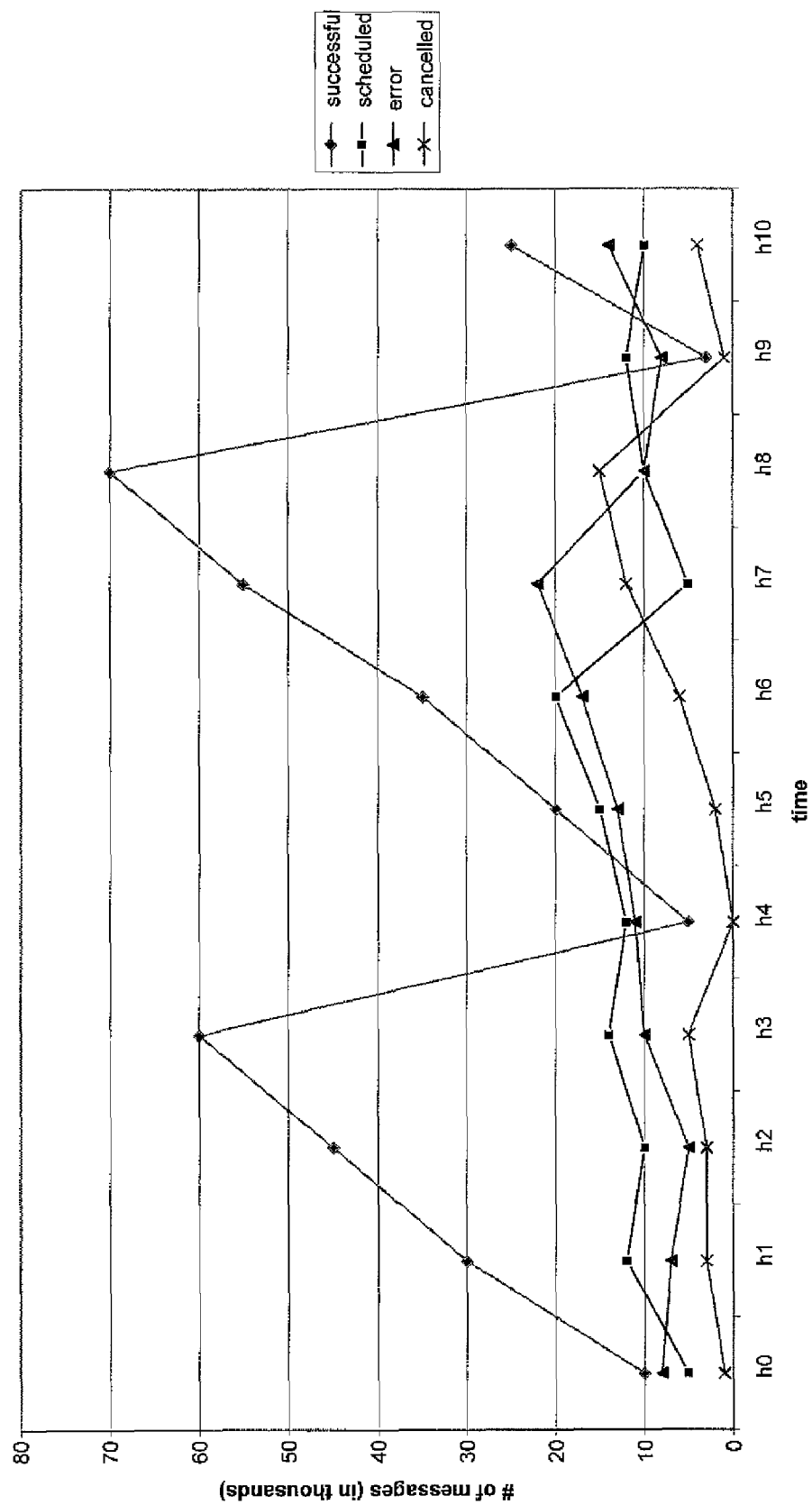
FIG. 9 shows a historical persistence layer view with the state partitions shown as individual curves.

FIG. 9 shows a historical persistence layer view with the state partitions shown as individual curves. Note that the curves for states successful and cancelled always increase until the deletion/archiving takes place where the curves come back to a value near zero again (in the example in intervals [h3,h4] and [h8,h9]). In contrast, curves for states scheduled and error can have variable shapes, but may indicate certain trends, i.e. showing a growing backlog. In the example, the backlog increases from h0 to h6, but is then reduced substantially in h7.

Historical Update View

The update view already provides a certain representation of message execution for the current, recently past interval $I_0$ displaying which messages have been received (via $\text{Inflow}(I_0)$) and which messages have been changed (via $\text{Changed}(I_0)$) and which messages have been set to a final status ($\text{Finished}(I_0)$).

Then the historical update view simply stores at time $h_{i+1}$ the corresponding update views built from sets $\text{Inflow}([h_i,h_{i+1}])$, $\text{Change}([h_i,h_{i+1}])$ and $\text{Finished}([h_i,h_{i+1}])$ as timelines both individually and in an aggregated way. Again, special customizable views can be configured. Furthermore, the development of the message load can be shown in a diagram.

Note that the historical update view can be represented by a diagram for the state partitions of $\text{Inflow}(I)$ and by a diagram for the state partitions of $\text{Change}(I)$. Both diagrams could be drawn in the same sheet. Set $\text{Finished}(I)$ is contained in the diagram of $\text{Change}(I)$ as it consists of state partitions for states successful and cancelled.

Complete History View

Sets $\text{Inflow}([h_0,h_1])$, $\text{Inflow}([h_1,h_2]), \ldots, \text{Inflow}[h_m,h_{m+1}])$ represent a disjoint union of all messages executed in XI ever since $h_0$. They remain constant with respect to their cardinality and they evolve over time from sets containing messages in different states to sets containing messages in final state only. Therefore, the complete history view should represent all messages that have ever been executed by XI in disjoint Inflow sets and should display their current state.

It is important to note that messages in a final state (synchronous messages or asynchronous messages in states successful or cancelled) are not changed any more and may be archived or deleted after some configured time. Therefore, message deletion and archiving must be integrated for calculating the actual state values of sets inflow(I) for the corresponding intervals.

This implies the following steps when recording new historic interval view at $h_{m+1}$:
1. Store $\text{Inflow}([h_m,h_{m+1}])$ together with the state numbers.
2. Update states of previous inflow sets $\text{Inflow}([h_i-h_{i+1}])$ (with i<m) according to the changes in $[h_m,h_{m+1}]$.
3. Update states of previous inflow sets $\text{Inflow}([h_i,h_{i+1}])$ (with i<m) according to numbers of message deletion and archiving activities in $[h_m,h_{m+1}]$.

Thus, the complete history view represents all messages that have ever been received by XI together with their actual state and with the information whether older completed messages have been deleted or archived. It is useful to drilldown to archived messages from this complete history view, but it may be quite difficult as messages in the archive are grouped/stored by the time of archiving an not by the time of arrival $t_S$.

Figure 10:
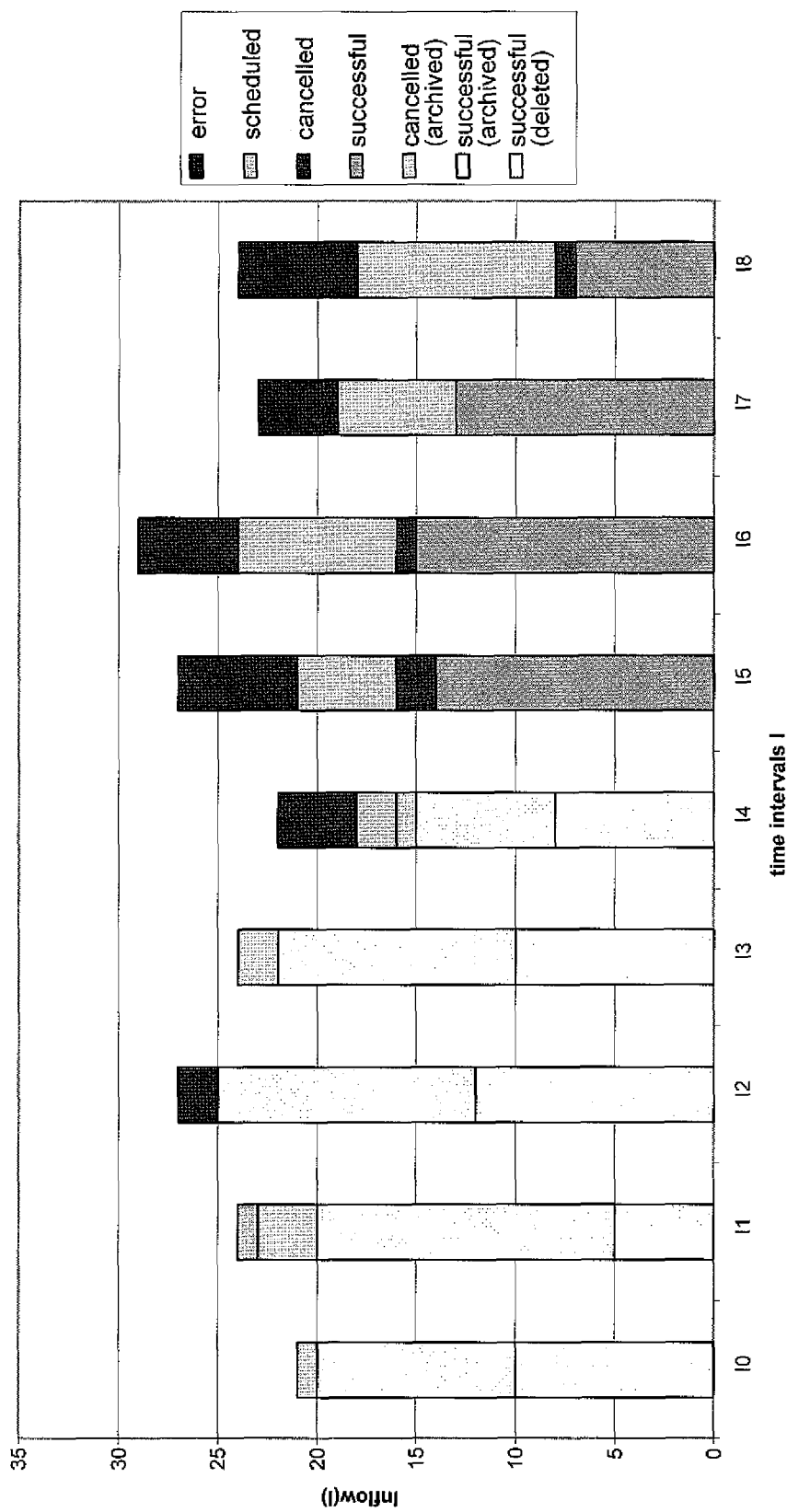
FIG. 10 shows a complete history view for an interval of message exchanges.

The example illustrated in FIG. 10 shows a complete history view for intervals I0 to I8 where messages arrived in intervals I0 and I3 are already completely deleted or archived, messages from intervals I1, I2 and I4 are still scheduled and/or in error state in the persistency layer and messages from intervals I5 to I8 are not archived or deleted at all. As synchronous messages do not experience any state update, sets Inflow never change over time with respect to their state partitions and must not be recalculated according to steps 2 and 3 in the above algorithm.

View Integration

Historical persistence layer (and historical update views) can be integrated with the current persistence layer view (and update view) by simply providing additionally the values for the current time to within the history diagram. Drilldown to the persistence layer is then only possible from these current values and not from historical diagram points. For customized views, the historical values may not be available since $h_0$, so only a subset from historical values from set H can be displayed then.

On the other hand, the complete history view is also integrated with the actual persistency layer view as the set partitions for the current message states are also represented there (in addition to the archived message states). Thus, a drilldown to the persistency layer is also possible here. Only the complete history view cannot be integrated with the historical persistency views, as the first represents the current state of all messages arrived at XI whereas the second only provides historical snapshots. Thus, the GMP preferably includes a default of two different views which are the historical persistency layer view with the current state of the persistency layer displayed and of the complete history view. Further customizable views may be offered by tab riders or via menu selection.

Detail Views

Figure 11:
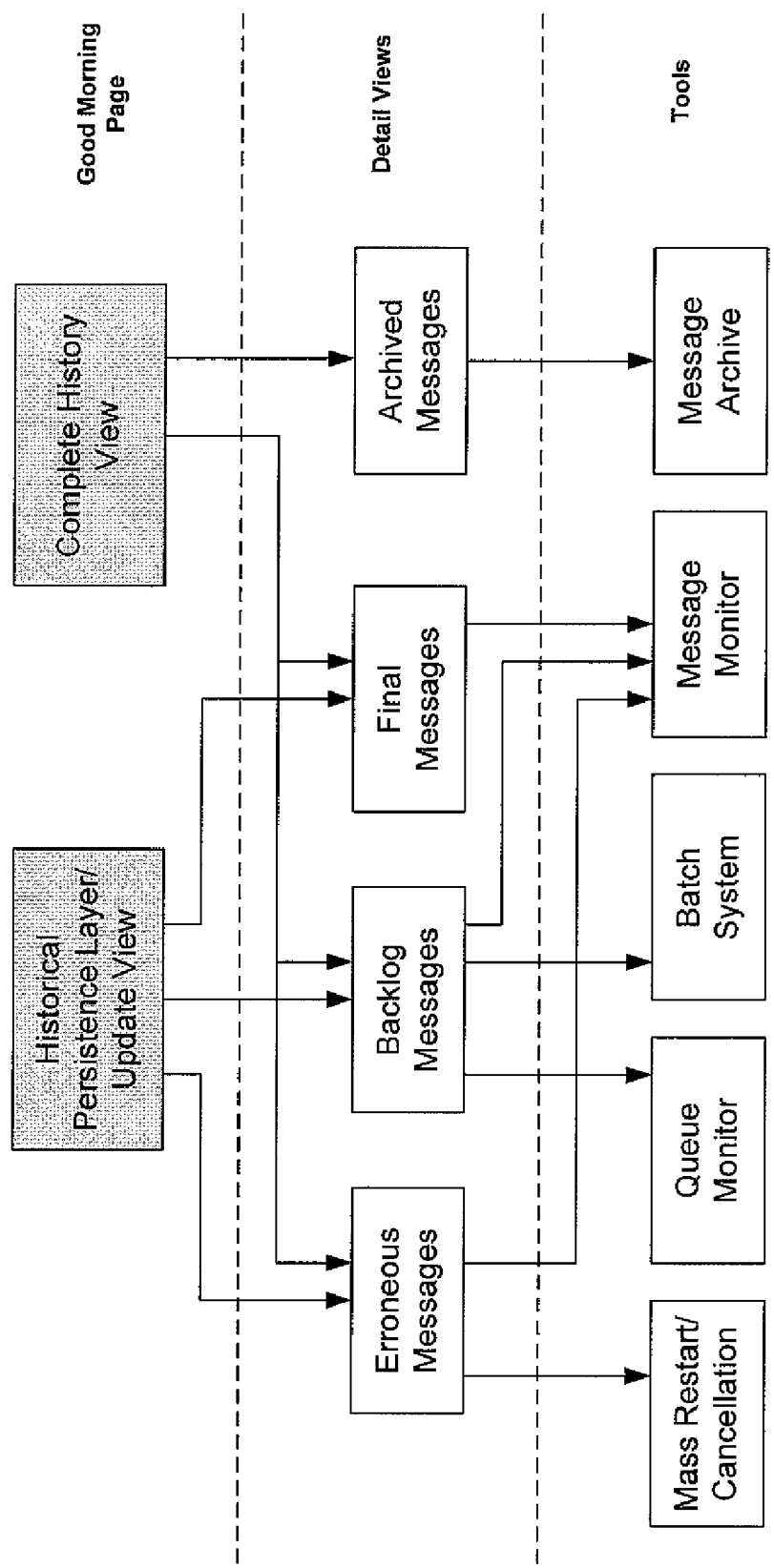
FIG. 11 shows the navigation structure from the good morning page to its detailed views and to the actual tools for message monitoring and manipulation.

From the abstract view of the good morning page described in the previous section it should be possible to drill down with respect to more specific message sets and eventually doing some control operations in addition to analyzing these message sets whenever this is possible. There are three main navigation paths for erroneous messages (including cancelled messages), for backlog messages (being in state scheduled or in batch mode) and for successful messages which are described in the following subsections. FIG. 11 shows the navigation structure from the GMP to its detailed views and to the actual tools for message monitoring and manipulation.

The detail views are still aggregated views with different groupings of messages. Just as the aggregated message view of the good morning page, each group is represented by its absolute number and its percentage with both representations based on absolute message numbers and message size available. When navigating from the component view of an adapter engine, the groups are also divided into inbound and outbound groups.

As the messages are constantly processed, the states of the messages are rapidly changed in the persistency layer. Therefore, navigation to the detail views at time $t_0' \geq t_0$ may lead to different aggregated values as shown in the GMP calculated at earlier time $t_0$. Nevertheless, we think that always the current values should be displayed and the user must take into account these effects.

Erroneous Messages

Navigating from the GMP to the view of erroneous messages should be intuitively possible by simply clicking on the area representing the error messages. Then, only the error messages of the current view are displayed in a more detailed, but still aggregated, view. Cancelled messages can also be optionally displayed.

The following groupings for different aggregated views should be supported:

Error codes/categories: each group is defined by a specific error code and category.

Number of errors/retries: each groups consists of all messages with a specific number of errors during their message execution.

Internal queues: each group consists of all messages scheduled in a specific internal execution queue. The queues may be grouped by different processing modes in the overview, being Exactly Once (EO) and Exactly Once In Order (EOIO) modes. Furthermore, the internal queues view should show the status of the queue.

Execution times: each group is defined by configurable time intervals (e.g. of an hour) and contains all relevant messages with their start time $t_S$, change time $t_C$, execution time $T_{exec}$, backlog time $T_{backlog}$ or error time $T_{error}$ lying in the corresponding intervals.

Priorities: each group consists of all messages with a certain message priority.

Sender system: each group consists of the messages from a certain sender system.

Receiver system: each group consists of the messages sent to a certain receiver system.

Sender&receiver system: each group consists of the messages from a certain sender system sent to a certain receiver system.

Adapter type and/or adapter channel: each group is defined by a specific adapter type or adapter channel Relevant application data: each group consists of messages containing certain application data.

Further navigation from these aggregated views to the message monitor displaying messages individually should be possible. For all aggregated views, restart and cancel operations should be possible group-wise. If restart/cancel operations are to be done for individual messages, navigation to the detailed message monitor is necessary.

Backlog Messages

Backlog messages are asynchronous messages that still need to be executed by an XI message component. They are stored in message state scheduled and batch (in the Integration Server) in the persistency layer. In general, they are planned in an internal execution queue. Navigating from the GMP to the view of backlog messages should be intuitively possible by simply clicking on the area representing the scheduled and batch mode messages. Then only the backlog messages of the current view are displayed in a more detailed, but still aggregated view.

The following groupings for different aggregated views should be supported:

Internal queues: each group consists of all messages scheduled in a specific internal execution queue. The queues may be grouped by EO and EOIO queues in the overview. Furthermore, the internal queues view should show the status of the queue.

Time of schedule (for scheduled messages only): each group is defined by configurable time intervals (e.g. of an hour) and contains all relevant messages scheduled during this interval.

Time of planned schedule (for batch messages only): each group is defined by configurable time intervals (e.g. of an hour) and contains all relevant messages that are to be scheduled during this interval.

Execution times: each group is defined by configurable time intervals (e.g. of an hour) and contains all relevant messages with their start time $t_S$, change time $t_C$, execution time $T_{exec}$, backlog time $T_{backlog}$ or error time $T_{error}$ lying in the corresponding intervals.

Number of errors/retries: each groups consists of all messages with a specific number of errors during their message execution Priorities: each group consists of all messages with a certain message priority.

Sender system: each group consists of the messages from a certain sender system.

Receiver system: each group consists of the messages sent to a certain receiver system.

Sender and receiver system: each group consists of the messages from a certain sender system sent to a certain receiver system.

Adapter type and/or adapter channel: each group is defined by a specific adapter type or adapter channel.

Relevant application data: each group consists of messages having attached certain application data.

Further navigation from these aggregated views to the message monitor displaying messages individually should be possible. For the internal queues and priorities view, navigation to the scheduling system (e.g. queue monitor) should be possible, thus allowing control operations in the scheduler. Analogously, the time of planned schedule view should allow navigation to the batch system.

Successful/Cancelled Messages

Navigating from the good morning page to the view of successful/cancelled messages should be intuitively possible by simply clicking on the area representing the successful messages. Then only the successful messages of the current view are displayed in a more detailed, but still aggregated view.

The following groupings for different aggregated views should be supported:

Execution times: each group is defined by configurable time intervals (e.g. of an hour) and contains all relevant messages with their start time $t_S$, change time $t_C$, execution time $T_{exec}$, backlog time $T_{backlog}$ or error time $T_{error}$ or lying in the corresponding intervals.

Number of errors/retries: each groups consists of all messages with a specific number of errors during their message execution Priorities: each group consists of all messages with a certain message priority.

Sender system: each group consists of the messages from a certain sender system.

Receiver system: each group consists of the messages sent to a certain receiver system.

Sender and receiver system: each group consists of the messages from a certain sender system sent to a certain receiver system.

Adapter type and/or adapter channel: each group is defined by a specific adapter type or adapter channel.

Relevant application data: each group consists of messages having attached certain application data.

Further navigation from these aggregated views to the message monitor displaying messages individually should be possible.

As stated above, the aggregated views are primarily taken over the persistency layer, but can be optionally extended to already deleted or archived messages. In the latter case, navigation to the actual message monitor is not possible any more. The message size representation of the aggregated group view should be extended to the disk space the messages consume (including predecessor message versions) so that the disk space consumption becomes transparent (especially in the execution time view).

Archived Messages

As mentioned above, navigation from the complete historical view to the archived messages should be possible. However, archived messages are stored in files according to their end times and not to their start times. Thus, the complete historic view will have to look into different archive files. Another approach could be an alternative complete history view grouping the messages by their end time. Furthermore, archived messages should be indexed by message header data and additionally by application data defined at least at design time (and possibly even at configuration time).

Performance Monitor

The performance monitor shows the relevant messaging times for a selected messaging scenario in an aggregated form.

Message Execution Times

Figure 12:
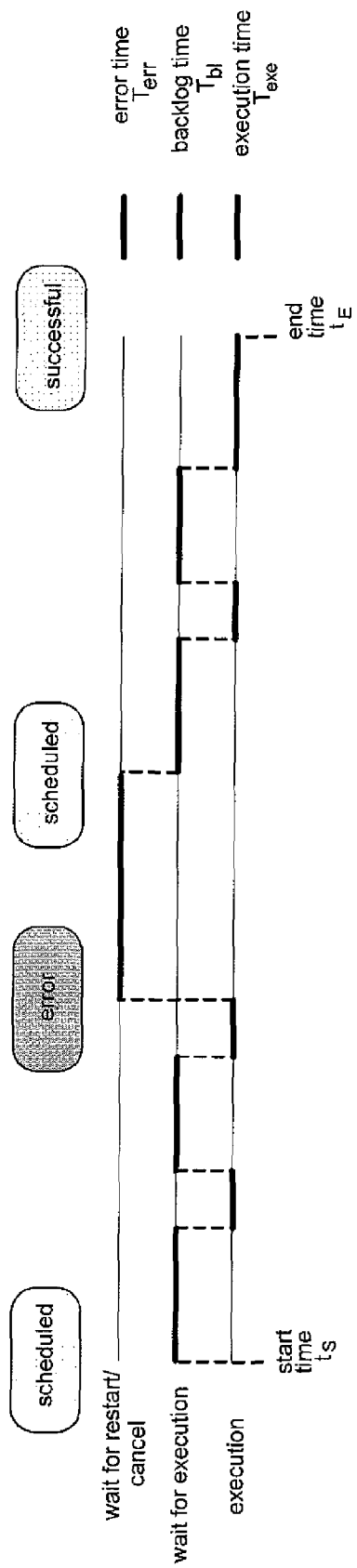
FIG. 12 is a timing diagram that depicts execution times of an asynchronous message within a messaging component.

The execution times of an asynchronous message within a messaging component are depicted by the timing diagram illustrated in FIG. 12. After arrival of the message m at start time $t_S(m)$ the message is scheduled in a corresponding scheduler queue where it waits for execution. After some time, the message is executed. There may be further asynchronous steps where the message is rescheduled for execution and re-executed again, until it reaches an error or successful state. In case of an error, the message waits for restart or cancellation and, in case of a restart, the message is rescheduled for execution again. This process of errors and subsequent restarts can occur several times until the message is finally cancelled or successfully sent to the next component at time $t_E$. In case of a receiver backend, the corresponding proxy is successfully executed.

The execution time intervals are added to message execution time $T_{exec}(m)$, the time intervals where the message is scheduled for execution are added to message backlog time $T_{bl}(m)$ and the time interval where the message is in a restartable error state are added to error time $T_{err}(m)$. We furthermore introduce the active time interval of a message as $T_{act}$ as the time a message is executed or actively waiting for execution as:

$$T_{act}(m) = T_{exec}(m) + T_{bl}(m)$$

and overall message latency time $T_\Sigma(m)$ of a message as the time until successful execution as $$T_\Sigma(m) = T_{exec}(m) + T_{bl}(m) + T_{error}(m) = T_{act}(m) + T_{error}(m)$$

Clearly, the overall processing time can also be calculated as the difference between end and start time:

$$T_\Sigma(m) = t_E(m) - t_S(m)$$

We assume that each asynchronous message has stored all these times in the persistence layer together with the number of restarts. Execution time can be subdivided into a fixed set of n non-overlapping execution steps with individual execution times $T_{exec,1}(m), T_{exec,2}(m), \ldots, T_{exec,n}(m)$ so that:

$$T_{exec}(m) = T_{exec,1}(m) + T_{exec,2}(m) + \ldots + T_{exec,n}(m)$$

This detailed representation can show bottleneck with respect to these individual execution steps (e.g. very expensive message mappings).

Synchronous Messaging

As synchronous messages do not wait for execution and can not be restarted, the latency time equals the execution time and the active time, because there are no backlog and error times. Again the execution times can be divided into non-overlapping execution steps.

Integration of Component Views

When a message is sent from a sender system to its final receiver component, several intermediary XI messaging components are involved. Depending on the processing mode, there are different overlapping processing and message transfer times that have to be taken into account. For a messaging component C, the previously introduced messaging times can be enhanced with component C as an additional parameter, denoting the time relative to this component, e.g. $t_S(C,m)$ (or $t_S(C)$ if message m is clear from the context), which further denotes the start time of message m relative to component C.

Asynchronous Messaging

Figure 13:
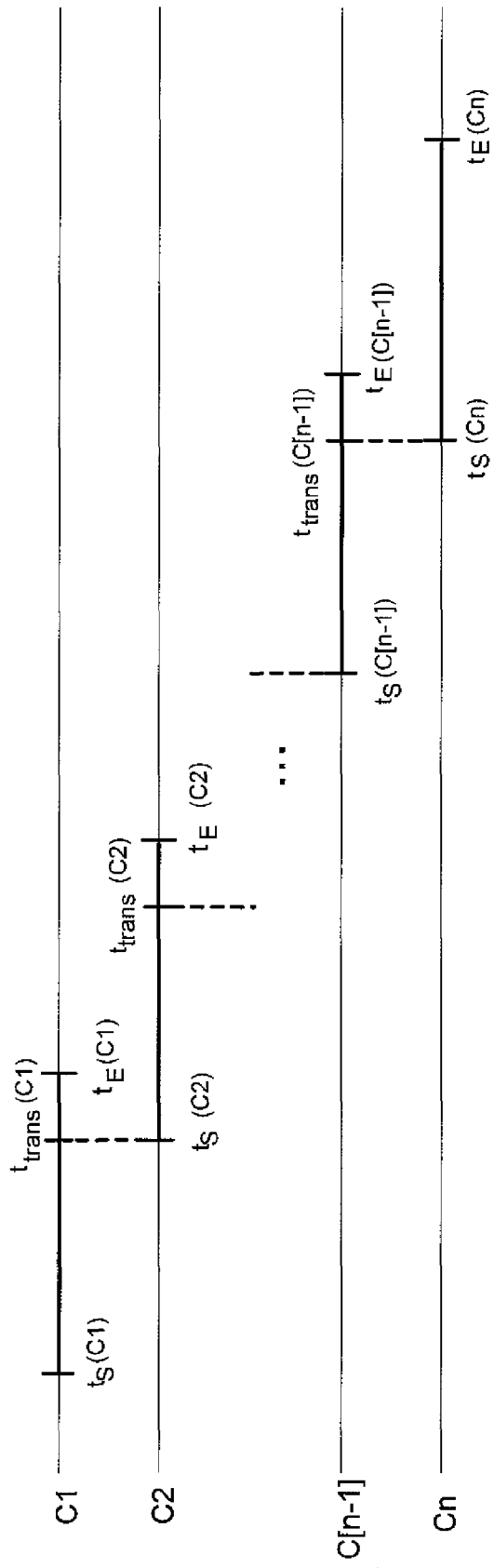
FIG. 13 is a timing diagram depicting execution of an asynchronous message.

The asynchronous message protocol uses a store-and-forward mechanism where the sending step of the sending component is its main last execution step and the asynchronous processing step of the receiving component is its first processing step. Therefore, when calculating the overall time from the first processing in the first sender component to the last processing step in the final receiver component, only the processing times until the sending step has to be added as shown in FIG. 13.

Here, $t_{trans}(C[i])$ denotes the start of the message transfer from component C[i] to the next component C[i+1]. The overall processing time of a message forwarded from sender component C1 to final receiver Cn over intermediary component C2 to C[n−1] is not calculated as $$T_\Sigma \ne T_\Sigma(C1) + T_\Sigma(C2) + \ldots + T_\Sigma(Cn)$$

Instead, we only take the shorter times $t_{trans}(C) - t_S(C)$ for each component:

$$T_\Sigma = (t_{trans}(C1) - t_S(C1)) + (t_{trans}(C2) - t_S(C2)) + \ldots + (t_{trans}(C[n-1]) - t_S(C[n-1])) + T_\Sigma(Cn)$$

to avoid counting the overlapping times. As the final receiver does not do a further sending step, its component time $T_\Sigma(Cn)$ can be added directly.

This model assumes that the time for the start of the message transfer between $t_{trans}(C[i])$ and $t_S(C[i+1])$ can be neglected. Therefore, it is an approximation. If the transfer time is substantial, this model needs to be refined.

Synchronous Messaging

As the synchronous model uses a blocking send model, the sending component always waits until the receiver has finished its work. Therefore, the overall time is simply the overall time of the first sending component:

$$T_\Sigma = T_\Sigma(C1)$$

Figure 14:
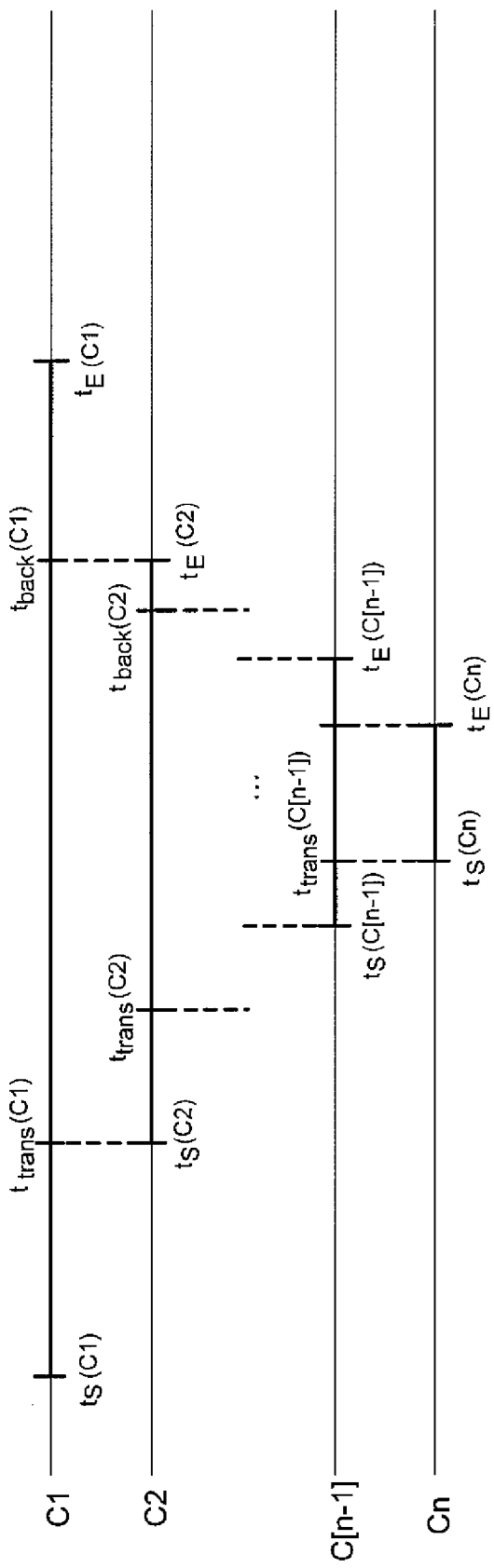
FIG. 14 is a timing diagram depicting execution of a synchronous message.

This mechanism is shown in FIG. 14 where the processing times of all subsequent components are included. Each component C[i] waits after the sending time $t_{trans}(C[n-1])$ until the synchronous response is received at time $t_{back}(C[n-1])$.

Monitor Views

The actual view of the performance monitor consists of a historic diagram similar to the message status monitor with separate graphs/lines for average execution times $T_{exec}$, backlog times $T_{bl}$ and error times $T_{err}$. As a display variant, the minimal and maximal values of these times can be shown graphically. These time values are aggregated over a certain time interval for all messages belonging to the selected messaging scenario. The performance monitor can be displayed for individual messaging components or for a message path within the XI domain. In the latter case, the system path has to be selected before.

As individual processing steps are measured, a drilldown to the detailed view of the processing times of the individual steps is supported. This can be a stacked area diagram type where each processing step is represented by a different area.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed is:

1. A monitoring system for a message exchange infrastructure, the monitoring system comprising:
    a server adapted to acquire monitoring information from the message exchange infrastructure, and transmit the monitoring information through a communication network to a graphical user interface, the graphical user interface presenting the monitoring information in a plurality of views, the plurality of views including:
        a first view representing a measure of errors of the message exchange infrastructure based on the monitoring information;
        a second view representing alerts caused by events that occur in the message exchange infrastructure;
        a third view representing a grouping of messaging data according to an execution state of the monitoring information, and further representing message stores that store the monitoring information, wherein during message execution, different versions of individual messages are stored in different message store types by messaging components, at least one message store being a persistency layer supporting asynchronous messaging, at least one message store being a main memory cache supporting synchronous messaging, and at least one message store being an archive storing messages deleted from other message stores; and
        a fourth view representing execution times for messages associated with the monitoring information,
        wherein the first view, the second view, the third view and the fourth view are co-occurring views.

2. A monitoring system in accordance with claim 1, wherein the monitoring information is based on messages to be transmitted through the message exchange infrastructure.

3. A monitoring system in accordance with claim 1, wherein the monitoring information includes messaging information of messages transmitted through the message exchange infrastructure, event information of operating events of the message exchange infrastructure, and component status information of one or more software components of the message exchange infrastructure.

4. A monitoring system in accordance with claim 1, wherein the graphical user interface includes a navigation mechanism to receive user-generated input navigating among the plurality of views, wherein the plurality of views represent views of increasing detail.

5. A monitoring system in accordance with claim 1, further comprising at least one message archive connected with a messaging component for storing a copy of a message transmitted through the message exchange infrastructure.

6. A monitoring system in accordance with claim 5, wherein the server is connected to the at least one message archive.

7. A monitoring system in accordance with claim 1, wherein the graphical user interface presents a first page having a graphical representation of the message exchange infrastructure and at least a part of the monitoring information.

8. An article comprising a non-transitory storage medium embodying instructions that when performed by one or more machines result in operations comprising:
    accessing monitoring information from a message exchange infrastructure via a web service; and
    rendering a graphical user interface comprising: the monitoring information acquired from a message exchange infrastructure, the monitoring information in a plurality of views for a user interface, the plurality of views including:
        a first view representing a measure of errors of the message exchange infrastructure based on the monitoring information;
        a second view representing alerts caused by events that occur in the message exchange infrastructure;
        a third view representing a grouping of messaging data according to an execution state of the monitoring information, and further representing message stores that store the monitoring information, at least one message store being a persistency layer supporting asynchronous messaging and at least one message store being a main memory cache supporting synchronous messaging, and at least one message store being an archive storing messages deleted from other message stores; and a fourth view representing execution times for messages associated with the monitoring information, wherein the first view, the second view, the third view and the fourth view are co-occurring views.

9. An article in accordance with claim 8, wherein the plurality of views includes a first page having a graphical representation of the message exchange infrastructure and at least a part of the monitoring information.

10. An article in accordance with claim 8, wherein the monitoring information includes messaging information of messages transmitted through the message exchange infrastructure, event information of operating events of the message exchange infrastructure, and component status information of one or more software components of the message exchange infrastructure.

11. An article in accordance with claim 8, wherein the plurality of views includes a persistence layer view representing persistence layers of associated messaging components of the message exchange infrastructure.

12. An article in accordance with claim 11, wherein the persistence layer view further includes a component view representing the local persistence layer of one messaging component in which representations of messages are grouped by conceptual message status.

13. An article in accordance with claim 11, wherein the persistence layer view further includes a landscape view representing an aggregated view of all persistency layers in the message exchange infrastructure.

14. An article in accordance with claim 8, wherein the plurality of views includes a historical view representing message exchange information over a user-selectable historical time period.

15. An article in accordance with claim 8, further comprising a navigation mechanism to receive user-generated input navigating among the plurality of views, wherein the plurality of views represent views of increasing detail.

16. A method for monitoring a message exchange infrastructure, the method comprising:

receiving, from a software component of the message exchange infrastructure, messaging data acquired from the message exchange infrastructure; and transmitting, through a communication network, monitoring information based on the messaging data to a graphical user interface, the graphical user interface presenting the monitoring information in a plurality of co-occurring views of increasing detail, the plurality of co-occurring views including:

a first view representing a measure of errors of the message exchange infrastructure from the software component based on the monitoring information;

a second view representing alerts based on events that occur in the message exchange infrastructure;

a third view representing a grouping of messaging data according to an execution state of the monitoring information, and further representing message stores that store the monitoring information, at least one message store being a persistency layer supporting asynchronous messaging, at least one message store being a main memory cache supporting synchronous messaging, and at least one message store being an archive storing messages deleted from other message stores; and a fourth view representing execution times for messages associated with the monitoring information.

17. A method in accordance with claim 16, wherein the monitoring information includes messaging information of messages transmitted through the message exchange infrastructure, event information of operating events of the message exchange infrastructure, and component status information of one or more software components of the message exchange infrastructure.

18. A method in accordance with claim 16, wherein the plurality of co-occurring views includes a first page having a graphical representation of the message exchange infrastructure and at least part of the monitoring information.

19. A method in accordance with claim 16, further comprising monitoring one or more messaging components of the message exchange infrastructure for selected messaging data.

20. A method in accordance with claim 19, wherein there are two or more messaging components, and wherein monitoring two or more messaging components includes monitoring a persistency layer associated with each of the two or more messaging components.

* * * * *